(12) United States Patent
Wood

(10) Patent No.: US 9,169,610 B2
(45) Date of Patent: Oct. 27, 2015

(54) COLLECTOR APPARATUS

(76) Inventor: Christopher Wood, West Sussex (GB)

( * ) Notice: Subject to any disclaimer, the term of this patent is extended or adjusted under 35 U.S.C. 154(b) by 252 days.

(21) Appl. No.: 13/697,748

(22) PCT Filed: May 13, 2011

(86) PCT No.: PCT/GB2011/000743
§ 371 (c)(1),
(2), (4) Date: Jan. 25, 2013

(87) PCT Pub. No.: WO2011/141719
PCT Pub. Date: Nov. 17, 2011

(65) Prior Publication Data
US 2013/0118998 A1      May 16, 2013

Related U.S. Application Data

(60) Provisional application No. 61/395,477, filed on May 13, 2010.

(51) Int. Cl.
*E02B 15/04* (2006.01)
*E02B 15/10* (2006.01)
*B01D 17/02* (2006.01)

(52) U.S. Cl.
CPC ............ *E02B 15/10* (2013.01); *B01D 17/0211* (2013.01); *E02B 15/046* (2013.01); *E02B 15/048* (2013.01)

(58) Field of Classification Search
CPC ............ B01D 17/0211; B01D 17/0214; E02B 15/045; E02B 15/046; E02B 15/047; E02B 15/048; E02B 15/10; C02F 1/40
USPC ................ 210/739, 747.6, 776, 96.1, 170.05, 210/170.09, 170.11, 242.3, 519, 521, 538, 210/540, 923
See application file for complete search history.

(56) References Cited

U.S. PATENT DOCUMENTS

| | | | | |
|---|---|---|---|---|
| 3,847,816 A | * | 11/1974 | DiPerna | 210/242.3 |
| 3,966,615 A | * | 6/1976 | Petchul et al. | 210/776 |
| 4,105,554 A | * | 8/1978 | Janson | 210/96.1 |
| 4,108,773 A | | 8/1978 | Macaluso | |
| 4,182,679 A | | 1/1980 | Van Hekle | |
| 4,271,017 A | * | 6/1981 | Milgram | 210/519 |
| 4,588,501 A | * | 5/1986 | Jordan | 210/242.3 |
| 4,839,050 A | | 6/1989 | Beard et al. | |
| 5,073,261 A | * | 12/1991 | Conradi et al. | 210/521 |
| 5,215,654 A | * | 6/1993 | Karterman | 210/242.3 |
| 5,405,538 A | | 4/1995 | Batten | |

FOREIGN PATENT DOCUMENTS

DE   43 06 174 A1   9/1994
FR   2 881 100 A1   7/2006

OTHER PUBLICATIONS

International Search Report for parent application PCT/GB2011/000743, having a mailing date of Aug. 25, 2011.

* cited by examiner

*Primary Examiner* — Christopher Upton
(74) *Attorney, Agent, or Firm* — Andrus Intellectual Property Law, LLP

(57) ABSTRACT

The present invention provides an apparatus, method and system for separating a first substance from a mixture of the first substance and a liquid. The apparatus comprises inlet means adapted to receive a portion of the mixture into a separator tank; a separator tank for holding a collected portion of the mixture and allowing the first substance to separate from the liquid due to the first substance having a different specific gravity to the liquid; and outlet means adapted to discharge the separated liquid and/or the first substance from the separator tank.

18 Claims, 10 Drawing Sheets

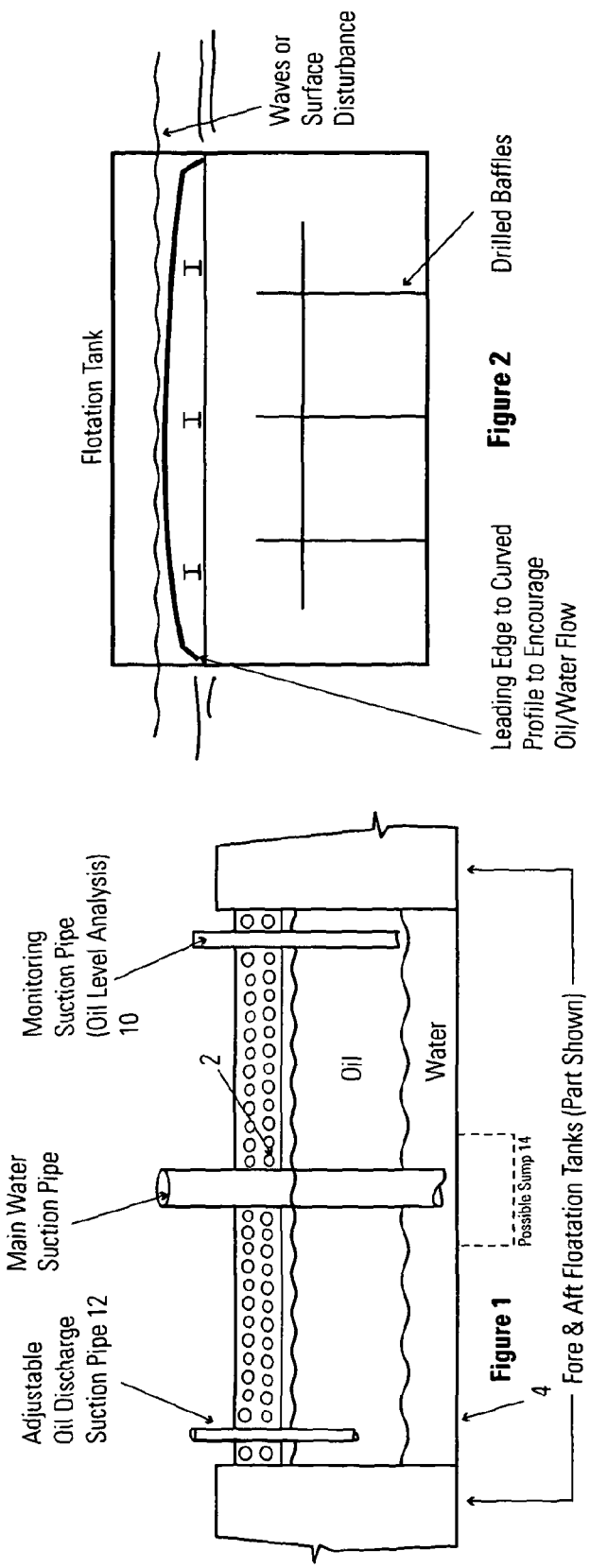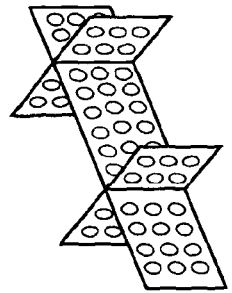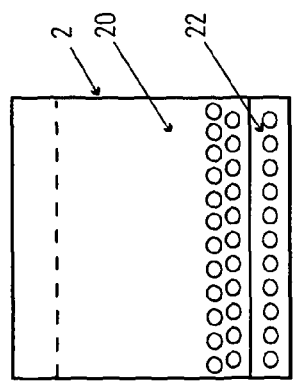

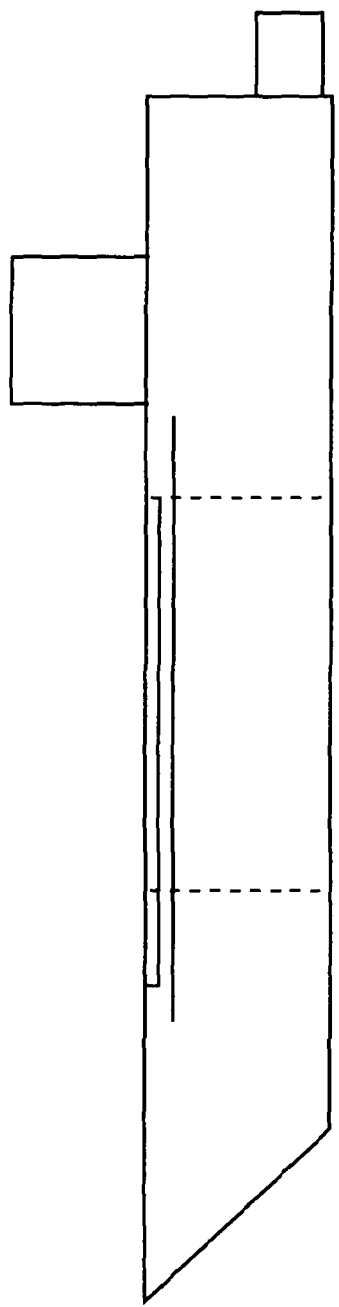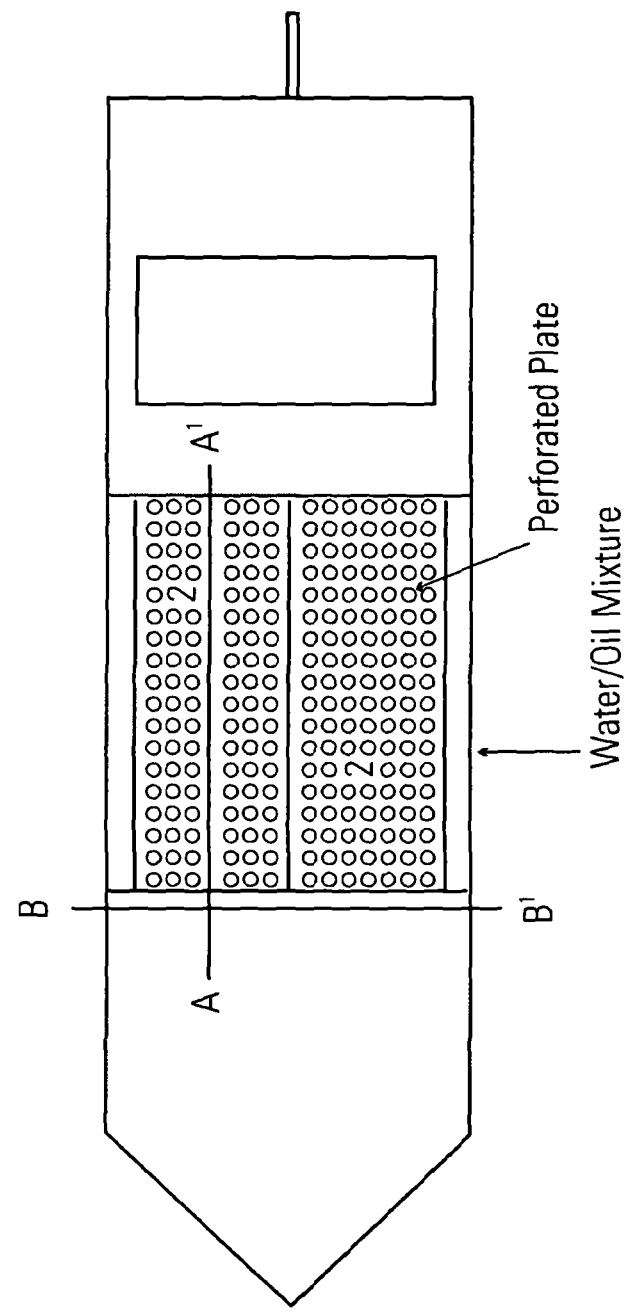
Figure 8
Figure 9

MULTI HULL OIL COLLECTOR (plan view)

STATIC NON PROPELLED OIL COLLECTOR (plan view)

ALTERNATIVE DEPLOYMENT - ANCHORED VESSEL

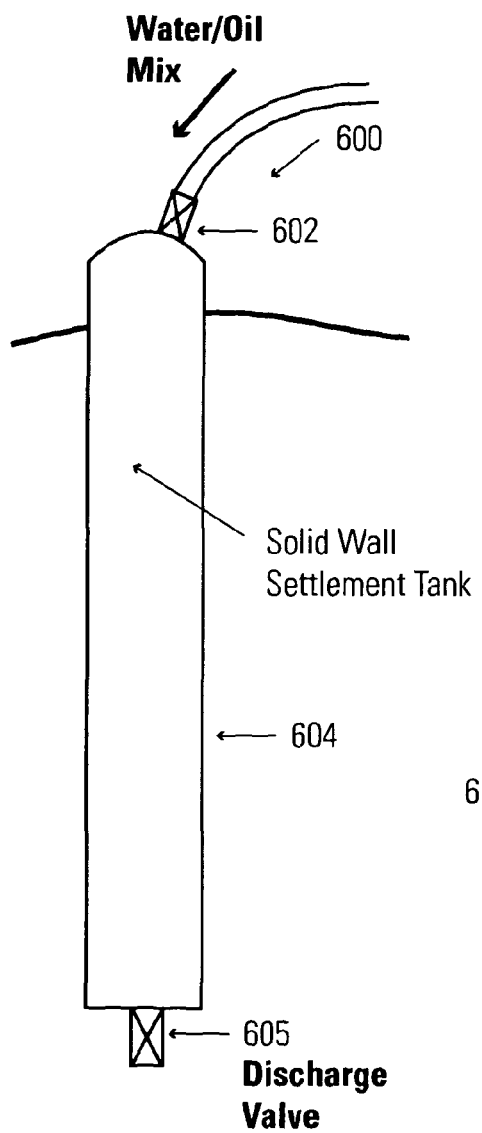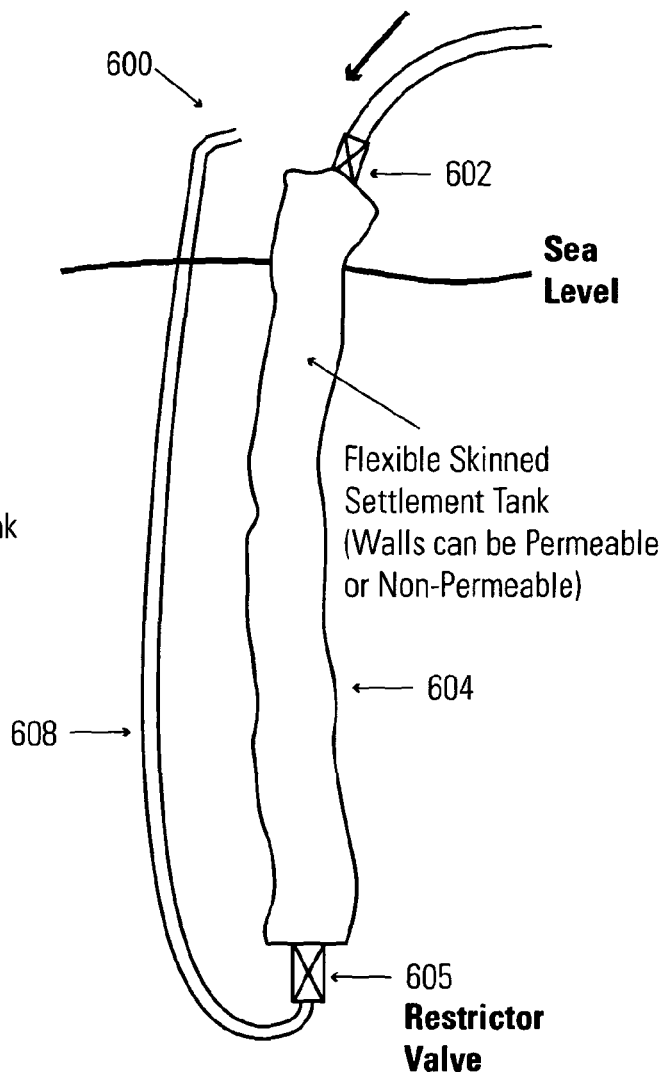
Figure 16
Figure 17

FLEXIBLE MEMBRANE, SOLID OR PERMEABLE, DESIGNED TO UNFOLD FROM ITS 'CONCERTINA' STATE ON THE DRILLSTICK - FOR EXAMPLE IN THE EVENT OF OIL SPILLAGE

COLLECTOR APPARATUS

CROSS-REFERENCE TO RELATED APPLICATIONS

This application is the U.S. national stage application of International Application No. PCT/GB2011/000743, filed May 13, 2011, which International application was published on Nov. 17, 2011 as International Publication No. WO 2011/141719 A1 in the English language and which application is incorporated herein by reference. The International application claims priority of U.S. Patent Application No. 61/395,477, filed May 13, 2010, which application is incorporated herein by reference.

BACKGROUND

The present invention relates to an apparatus, system and method for separating a first substance from a mixture of the first substance and a liquid.

Oil spills damage the environment and endanger marine life. There is therefore a continuing need to provide apparatuses and methods which can be employed to provide cleanup and recovery from an oil spill.

One known apparatus for removing oil floating on water, is an oil skimmer. There are a number of known oil skimmers, for example a weir skimmer or a drum skimmer.

A weir skimmer skims a top level of surface fluid. The fluid passes through the skimmer and is pumped out of the skimmer. To collect oil floating on water, the depth of fluid skimmed can be set to a depth of the oil floating on top of the water, such that oil is passed through the skimmer.

Drum skimmers function by using a rotating element such as a drum, to which the oil adheres. The oil is wiped from the surface of the drum and collected.

SUMMARY

The present invention provides significant improvements to the above described skimmers. The apparatus of the present invention has an inlet means through which a mixture of oil and water is passed into a separator tank. The oil and water separates within the separator tank due to oil having a lower specific gravity than water. Once separated, the water may be discharged from the separator tank and the oil being retained for collection in the separator tank.

In a first aspect, the present invention provides an apparatus for separating a first substance from a mixture of the first substance and a liquid, the apparatus comprising: inlet means adapted to receive a portion of the mixture into a separator tank; a separator tank for holding a collected portion of the mixture and allowing the first substance to separate from the liquid due to the first substance having a different specific gravity to the liquid; and outlet means adapted to discharge the separated liquid and/or the first substance from the separator tank.

Preferably, the inlet means comprises an inlet surface which may be a perforated plate. The perforations may be adjustable in size and shape.

In one embodiment, the inlet surface is pivotably attached to the separator tank.

The inlet surface preferably comprises a means for reducing the disturbance of the first substance and the liquid when the mixture passes over the inlet surface and into the separator tank.

The apparatus may comprise a first outlet means for discharging the liquid and a second outlet means for discharging the first substance. Alternatively, the outlet means discharges the separated liquid but not the first substance or the outlet means discharges the first substance but not the separated liquid.

Preferably, the apparatus comprises a discharge pump for extracting the separated liquid from the separator tank via the outlet means.

The separator tank may comprise a further means for reducing the disturbance of the liquid and the first substance as the liquid is pumped from the separator tank which may be a baffle.

The apparatus may comprise a means for detecting a purity level of the liquid. This may comprise a sampler pump to extract a portion of the liquid from the tank and a detector configured to detect the purity level of the portion of the liquid. There may be provided a switching means configured to switch off the discharge pump when the purity level of the liquid falls below a predetermined threshold value. Alternatively, or in addition, there may be provided an indicator configured to indicate when the purity level of the liquid falls below a predetermined threshold value. Alternatively, or in addition, the apparatus may comprise a oil-water level monitor. A switching means may be provided to switch the pump off when the oil-water level reaches a predetermined level in the separator tank.

In a preferred embodiment, the apparatus is a vessel at least partially submerged within the mixture and the inlet means is adapted for receiving a portion of the mixture from the surface of the mixture. The vessel may be adapted to float within the mixture and the vessel comprises a flotation means to maintain the depth of submersion relative to the surface of the mixture.

In one use, the liquid is water and the substance is oil.

The inlet surface may be shaped and/or angled relative to the surface of the portion of the mixture in the separating tank. The apparatus may further comprise a receiving surface pivotally connected to the inlet means, the receiving surface adapted to allow the portion of the oil-water mixture to flow over the receiving surface to the inlet means. The receiving surface may comprise a flotation means to maintain an inlet side of the receiving surface at a fixed distance relative to the surface of the mixture.

The apparatus may further comprise a means for encouraging the water-oil mixture to pass through the inlet surface. The encouraging means may comprise one or more of a vibration means, a water spray, a wiper or a flexible rotating paddle.

In one embodiment, the inlet surface is surrounded at least in part by a sidewall configured to extend above the surface of the mixture when it flows over the inlet surface.

The separator tank may comprise a flexible membrane which may be permeable.

In a second aspect, the present invention provides an apparatus for separating a first substance from a mixture of the first substance and a liquid, the apparatus comprising: inlet means adapted to receive a portion of the mixture into a separator tank; a separator tank comprising a permeable material adapted to retain the first substance and allow passage of the liquid; and outlet means adapted to discharge the first substance from the separator tank.

In a third aspect of the invention, there is provided a system for separating a first substance from a mixture of the first substance and a liquid, the system comprising: a first apparatus as described above; a second apparatus as described above; wherein the system is configured such that the separated liquid discharged from the first apparatus is passed into the inlet means of the second apparatus.

In a fourth aspect of the invention, there is provided a system for separating a first substance from a mixture of the first substance and a liquid, the system comprising: the apparatus as described above; and at least one boom connected to the apparatus and adapted to direct the mixture to the apparatus. The system may comprise a pair of booms. The at least one boom may be at least one oil boom.

Each boom may comprise an adjustable flotation means adapted to maintain the depth of submersion of the oil boom relative to the surface of the mixture. The adjustable flotation means may be a compressed airbag contained in a partially flooded float.

In one embodiment, the present invention provides a floating vessel (e.g. a powered vessel such as a boat, a tug or an oil tanker) and the apparatus as described above connected to the vessel. Alternatively, the apparatus may be built as a floating vessel (e.g. a dredger, a catamaran or oil tanker).

In a fifth aspect of the invention, there is provided a method for separating a first substance from a mixture of the first substance and a liquid using the apparatus as described above, the method comprising: passing a portion of the mixture through inlet means of the apparatus such that the mixture is received by the separating tank of the apparatus; separating in the separator tank the first substance from the liquid due to the first substance having a different specific gravity to the liquid; and discharging the separated liquid and/or the first substance from the separator tank via an outlet means.

The method may comprise discharging the separated liquid but not the first substance. Alternatively, the first substance but not the liquid is discharged Discharging the separated liquid may comprise extracting using a pump the liquid from the separator tank.

The method may further comprise detecting a purity level of the separated liquid.

An additional step may be to indicate using an indicator when the purity level has fallen below a predetermined threshold.

The method may comprise towing the apparatus through the mixture.

The apparatus may be connected to a pair of booms and towed through the mixture, wherein the booms are adapted to direct the mixture to the apparatus.

The method may be applied to separate oil from a mixture of oil and water.

BRIEF DESCRIPTION OF THE DRAWINGS

The present invention will now be described in detail with reference to the accompanying drawings, in which:

FIG. 1 is a schematic cross-sectional view of the apparatus according to a first embodiment of the invention;

FIG. 2 is a schematic cross-sectional view of the apparatus according to the first embodiment of the invention;

FIG. 3 is a schematic plan view of an inlet surface for the apparatus;

FIG. 4 is a schematic perspective view of a baffle;

FIG. 8 is a side view of a vessel according to a third embodiment of the present invention;

FIG. 9 is plan view of the vessel as shown in FIG. 8;

FIG. 16 is a side view of an apparatus in accordance with the present invention;

FIG. 17 is a side view of an apparatus in accordance with the present invention;

DETAILED DESCRIPTION OF THE DRAWINGS

Figure 5:
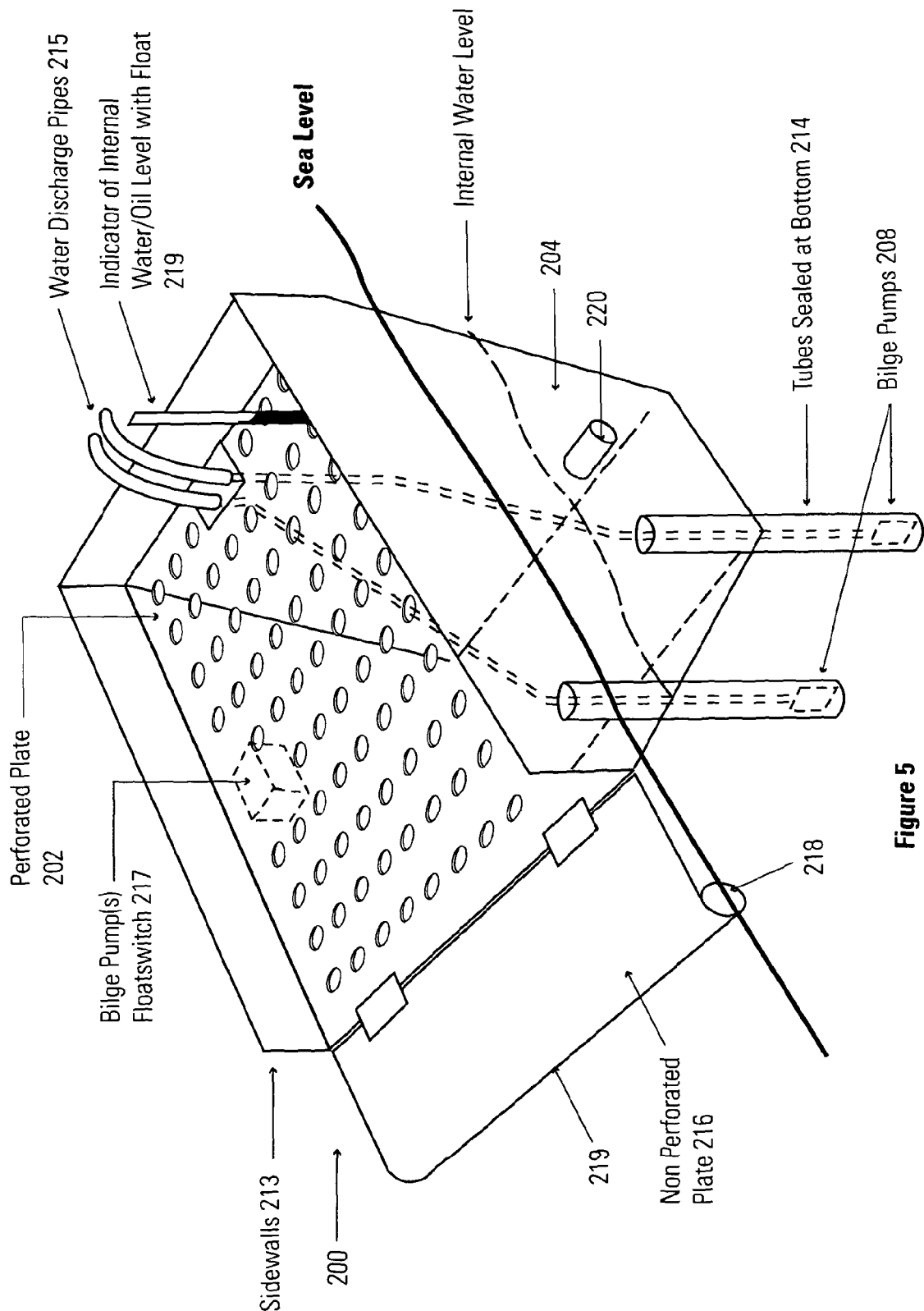
FIG. 5 is a schematic perspective view of a cross-sectional view of an apparatus according to a second embodiment of the invention.

FIG. 1 shows an apparatus 100 according to a first embodiment of the present invention for separating a first substance (e.g. oil) from a mixture of that first substance and a liquid (e.g. a mixture of oil and water). For the purpose of describing the aspects and embodiments of the invention, the terms oil and water will be used. However, the apparatuses and corresponding methods are not limited to use for separating oil from an oil-water mixture, but can separate any first substance from a liquid, where that first substance has a different specific gravity to the liquid.

The apparatus 100 of the first embodiment is intended to float in contaminated water, comprising a mixture of oil and water, e.g. in the sea, a river, lake or estuary, etc. The apparatus comprises an inlet surface 2 adapted to receive a mixture of oil and water, a separator tank 4 for holding the mixture of oil and water, a discharge pump 8 (e.g. a main water suction pipe) for removing separated water from the separator tank 4 and flotation tanks 6 to maintain the depth of submersion of the apparatus 100 within the mixture. As shown in FIG. 1, the apparatus 100 preferably comprises a sampler pump 10 (monitoring suction pipe) and an adjustable oil discharge suction pipe 12. The apparatus 100 may also include a sump area 14 for collecting the separated water. The sump may comprise a tube extending down from the separator tank 4, as shown in FIG. 4. The sump provides a greater depth for separation of oil and water, without appreciably adding to the volume of the apparatus as a whole.

In use, the apparatus 100 is floated in the mixture using the flotation tanks 6. Portions of the mixture flow over and through an inlet surface 2 into the separator tank 4 below. The flotation tanks are chosen such that the inlet surface 2 of the apparatus 100 is at a similar height in the contaminated water to the surface level of the water, such that the surface layer (which is where the majority of the contamination will lie due to oil having a lower specific density than water) is able to wash up and over the inlet surface 2.

The inlet surface 2 may be a plate comprising apertures, both the oil and water passing through the apertures. The apertures can be slots, holes, slats or other openings. Preferably, the plate comprises at least ten apertures and, more preferably, at least one hundred or one thousand apertures. In one form, as illustrated in FIG. 3, the apertures are adjustable to regulate ingress according to capacity. The apertures may be adjustable until an optimum size is established, by incorporating two similarly drilled plates 20, 22 which slide relative to one another to adjust the effective aperture size. A further development is that that the plates 20, 22 can be slid relative to one another, not merely to achieve adjustment of aperture size, but to wipe thick sticky oil from the plates 20, 22 into the tank 4 below. In another embodiment of the plate, the apertures may have a simple raised profile on the back edge which would effectively scoop the oil/water mix into the tank 4.

By using a perforated plate, when collecting oil, the apparatus has the advantage of also collecting rubbish and wildlife which can be readily disposed of or collected since it will collect on top of the plate.

As shown in FIG. 2, the leading edge of the inlet surface 2 is adapted to replicate that of a sandy beach with waves washing over it. The shape and angle of the inlet surface 2 is important, as is the height of the inlet surface relative to the contaminated water level (e.g. the sea level). The shape is configured to imitate the action of waves washing up shallow sandy beaches, with the reducing waves reaching the innermost apertures in the plates, allowing the oil-water mixture to pass through. The shape is curved at the point of contact with the sea and angled slightly upward to replicate the natural motion of a gentle beach slope with waves washing up the beach, thereby encouraging the oil-water mix to flow over the perforated plates and in to the tank below. In other embodiments, the plate may be level with the sea surface or may be angled slightly downwards.

As illustrated in FIG. 2, the separator tank 4 is preferably baffled to reduce the disturbance of the water and oil in the separator tank. A baffled tank has flow-directing vanes or panels within the tank, to reduce the disturbance of the oil and water separation. In one embodiment, as shown in FIG. 4, the baffle comprises a number of panels joined together to form compartments (the baffle being located within the separator tank as shown in FIG. 2). The panels may be drilled to allow oil and water to pass from one compartment to the other. Alternatively, the baffle may comprise wire/synthetic wool. Furthermore, the perforated plate 2 acts to reduce the disturbance of the oil and water within the separator tank 4 by limiting the amount of mixture that can flow into the tank 4 and providing a large surface area over which the mixture can enter the tank 4. As the oil-water mixture accumulates in the baffled separator tank, the oil is separated from water using the natural tendency of oil to float on water due to its lower specific gravity. When adequate separation has occurred, the separated water is pumped by the main high powered pump 10 from a sump area 14 at the bottom of the tank back in to the sea. In order to reduce disturbance caused by the suction of the pump which would reduce effective oil separation, a horizontal baffle (or a number of baffles) is provided to dampen the effect. Meanwhile a small sampler pump 10 whose suction pipe is set at a slightly higher level within the tank, also extracts the water. The purpose of this pump 10 is to monitor the oil level and water purity and may include an oily water separator device preset to stop at a predetermined oil contamination level, 500 ppm for example, or whatever purity is required (e.g. 5 ppm or pure water), thereby preventing oil being discharged back into the sea. When the oil contamination level exceeds a threshold level (e.g. 500 ppm, 5 ppm, 0 ppm etc.), the main pump 8 is turned off immediately, this may be achieved automatically (via a switching device) or manually controlled via an alarm/indicator system.

The process continues, allowing more oil-water mixture from the sea surface to pass over the perforated plate 2 and into the tank 4. The balance is maintained by removing water and/or oil from the tank 4.

Once sufficient oil has been collected in this manner, the oil is pumped out to another vessel via a suction pipe 12 whose height can be adjusted to match the oil level in the tank 4. Alternatively a floating pump with suction level set just below the surface can be employed. Any water inadvertently picked up can be re-circulated from the separate oil holding tank.

Since the oil may be thick or thin in nature, heavy or light crude, diesel oil etc, the apertures in the perforated plate 2 may become blocked. This situation may be remedied by causing the perforated plates to vibrate using a suitable vibration machine and/or hot or cold water jets can be directed over the perforations. In one embodiment, the sample pump 10 may be configured to discharge jets of water over the perforated plate to further encourage thick oil into the collection tank. In addition or alternatively, the plates may be coated with a suitable friction lowering material to deter the oil from sticking. In addition, or alternatively, a wiping mechanism can be used to wipe the oil into and through the orifices or the perforated plate. In an alternate embodiment, the apparatus may comprise a rotating barrier which may be of an absorbent nature, which rotates against a fixed object which would effectively squeeze the oil out of the barrier and into the tank below.

The baffles (as shown in FIG. 4) are designed to reduce side slop and encourage separation as much as possible by the natural settlement of oil on the surface of the denser water. Drillings or perforations would be incorporated to balance the tank at both water and oil levels. Simple flap valves designed to allow water flow in one direction only, towards the pump out sump would allow this water to be passed through a filtration stage where this is considered necessary.

Figure 7:
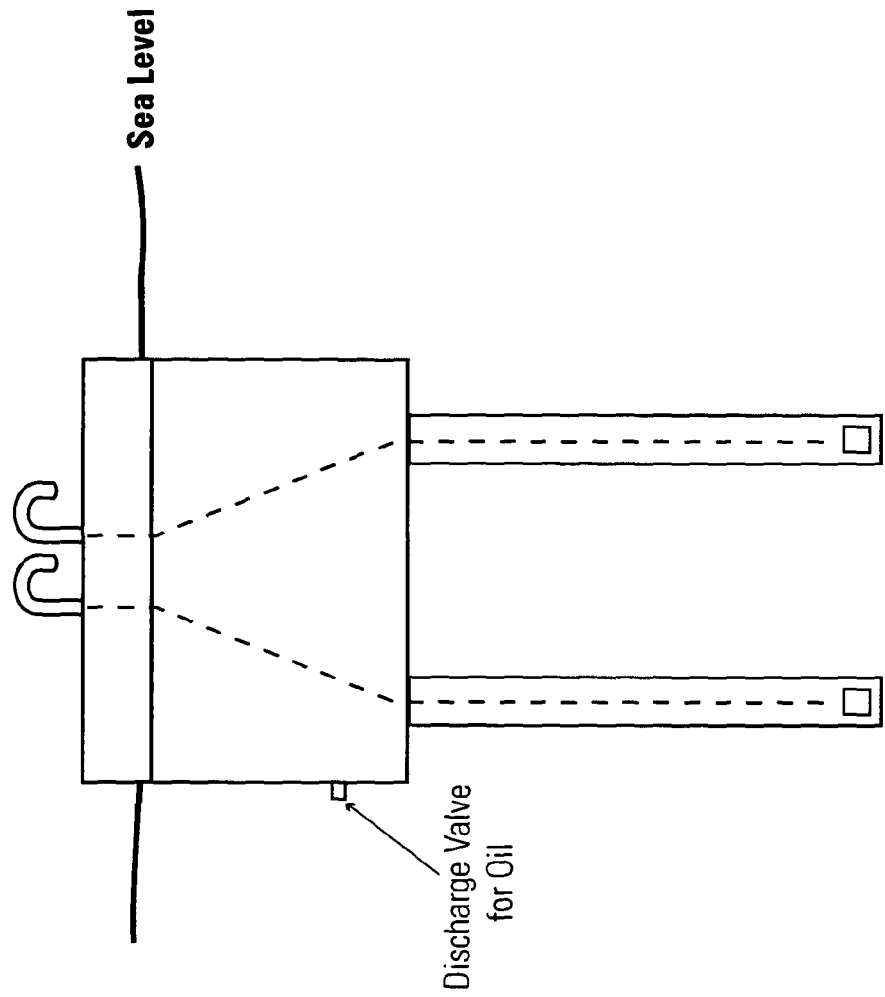
FIG. 7 is a schematic view from the back of the apparatus shown in FIG. 4.
Figure 6:
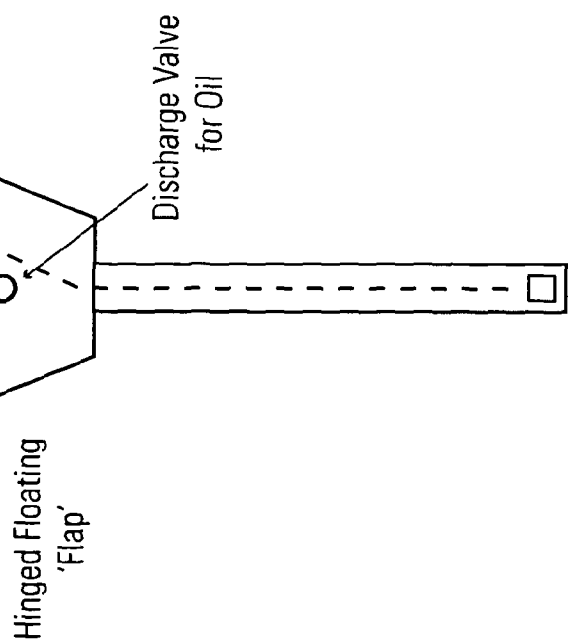
FIG. 6 is a schematic side view of the apparatus shown in FIG. 4.

FIGS. 5 to 7 illustrate a second embodiment of the apparatus 200 according to the present invention. The apparatus 200 is similar to that illustrated in FIG. 1 in that it comprises a perforated plate inlet surface 202, a separator tank 204, a water discharge pump 8 (one or more bilge pumps), and a sump area 214 (which in this embodiment comprises sealed tubes 214 extending below the separator tank). The apparatus 200 also includes adjustable flotation means (not shown) which can be located along the parallel sidewalls 213.

The apparatus includes sidewalls 213 which at least partially surround the perforated plate 202. The sidewalls ensure that any oil-water mixture which washes over the plate passes through the plate and into the separator below, rather than running off the plate and back into the sea.

The apparatus 200 comprises a receiving surface 216 in the form of a hinged non-perforated plate 216. The inlet side 219 of the receiving surface 216 has a curved profile to encourage the mixture to flow over the receiving surface and across the perforated plate 202. The receiving surface 216 comprises a float 218 to maintain a distance of the inlet side 218 from the surface level of the mixture in which the apparatus 200 floats.

In use, the separated water which accumulates in the sealed tubes 214 is pumped from the bottom of the sealed tubes 214 using one or more bilge pumps 208 and discharged back into contaminated water in which the apparatus floats, e.g. back into the sea, via discharge pipes 215. Alternatively, the water passed through the discharge pipes 215 can be discharged into a further filtration stage, as discussed later with reference to FIGS. 16 and 17. A discharge valve 220 may be provided to discharge oil collected in the separator tank 204.

The apparatus 200 may include a bilge pump flotation switch 217. The flotation switch 217 switches the bilge pump on or off based on the liquid level within the separator tank 204. Thus, the flotation switch 217 is configured to switch the pump on when the liquid level rises above a first preset level in the tank and switch the pump off when the level falls below a second preset level in the tank, maintaining the liquid level within the separator tank 204. The apparatus may also include an indicator 219 to indicate the water-oil level using a float. This may be desirable to monitor the stability of the water-oil separation within the tank. As with the previous apparatus 100, the apparatus 200 may also include a sampler pump to detect the purity level of the water.

FIGS. 6 and 7 illustrate the apparatus of FIG. 5 from the side view and the back view respectively.

The above apparatuses 100, 200 are designed to float, at least partially submerged within the water. The apparatuses may be anchored to the sea/lake bed or may be towed/self propelled. If the motion (pitching or rolling) of the vessel when collecting oil at anchor or going slowly ahead is reducing the "wash over" effect of the waves, then this situation can be improved by the deployment of stabilising measures. These can take the form of fixed fins attached to the hull, or standard type stabilisers powered hydraulically electrically or pneumatically. Alternatively a "flume" stabilising tank can be fitted to provide additional stability. Such a flume stabilising tank is provided in the second embodiment by way of the sealed tubes 214 (see FIG. 5). Whilst at anchor the apparatus can also be stabilised by the use of sea drogues to dampen the motion.

Self propelled vessels, using the principles outlined above could be constructed to a scale that suits their intended use from small portable models to converted oil tankers. They could also be produced without propulsive power, being anchored or towed into position.

Figure 10:
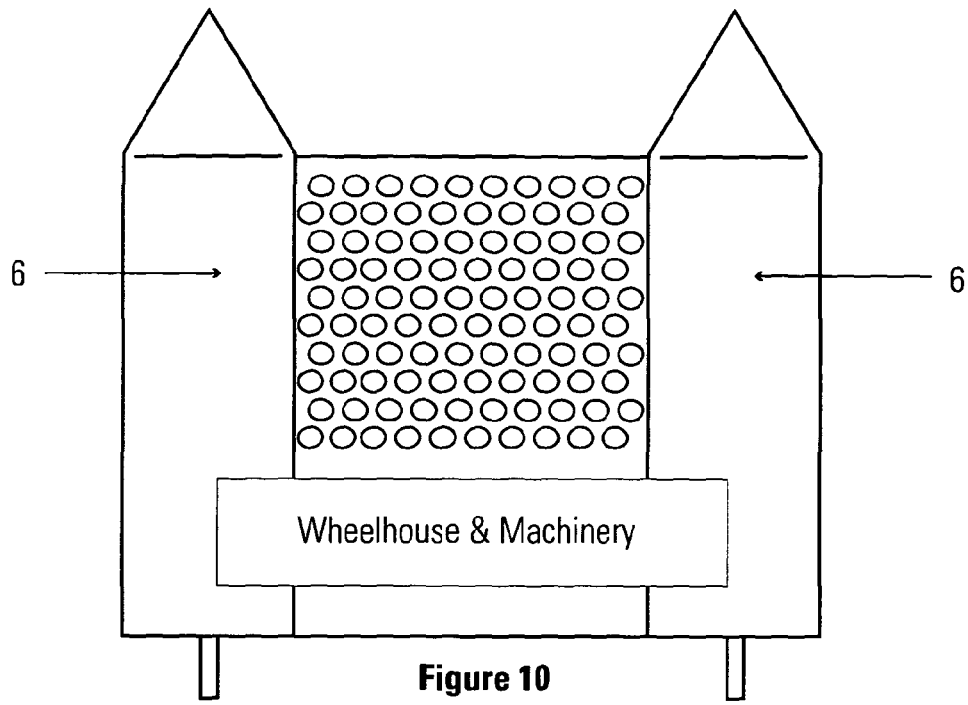
FIG. 10 is a plan view of a multi-hull oil collector in accordance with the present invention.

Using the same collection principles as those described above, the apparatus can be of the present invention may be built as a multi-hulled or catamaran vessel, with the previously described separator tank mounted between flotation/ballast hulls 6 such that deployment would normally be from a forward direction with the leading edge of the separator tank facing forwards, as shown in FIG. 10. Alternatively a further leading edge can be provided on the aft end enabling oil to be collected from both ends of the vessel. Generally the provision of multi hulled vessels operating from fore and aft would facilitate operations when compared to port and starboard side operation. Ballast and oil pumping equipment to maintain correct deployment height relative to sea level and to discharge recovered oil together with propulsion machinery and controls would be mounted on one or both flotation tanks. As an alternative, the vessel could also be mono hulled with the previously described collection tank forming the forward and/or aft section of the vessel.

Figure 11:
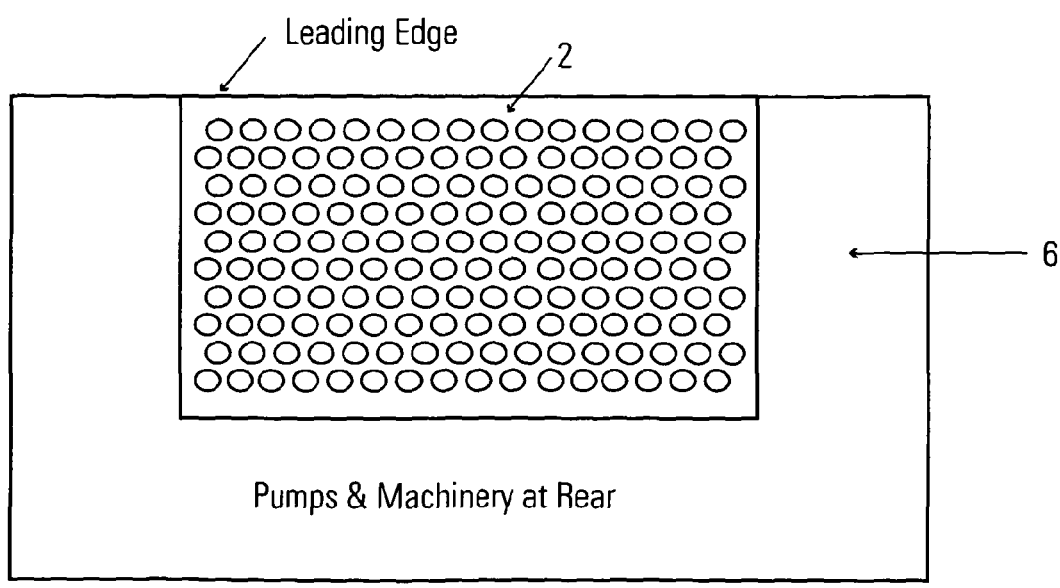
FIG. 11 is a plan view if a static non-propelled apparatus in accordance with the present invention.
Figure 12:
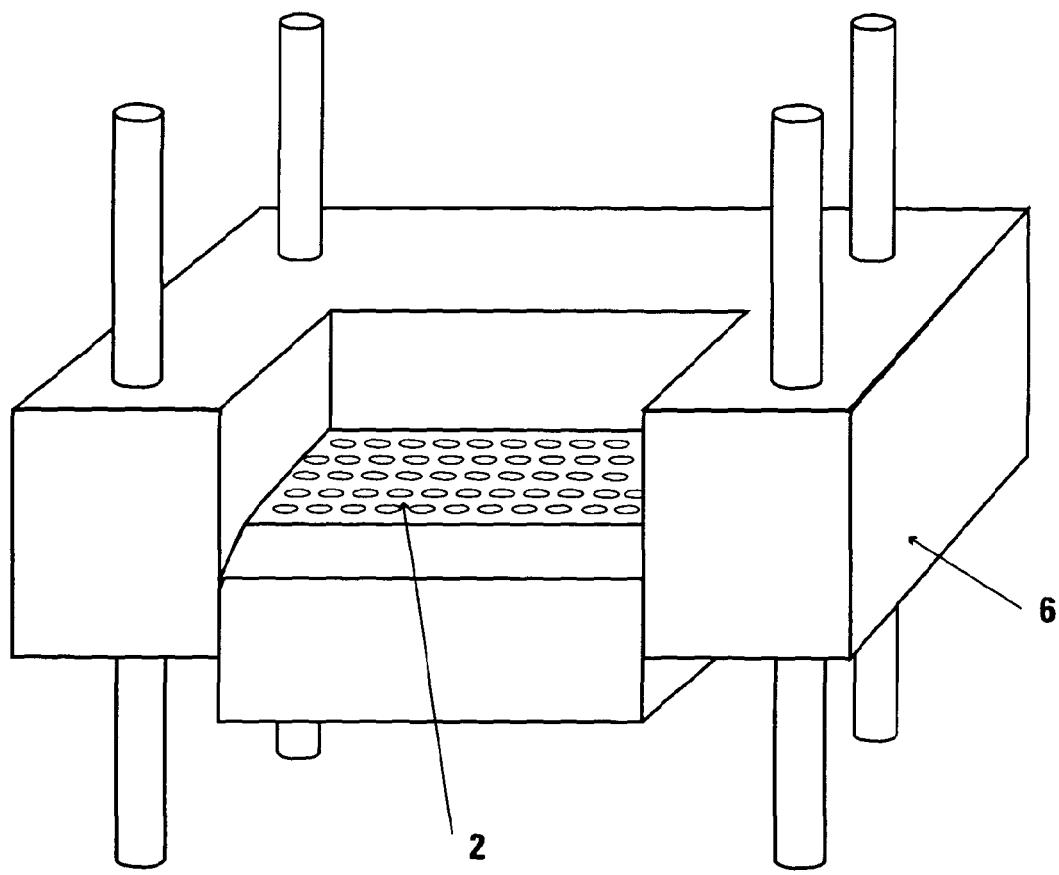
FIG. 12 is a perspective view of a static apparatus on a jack.

In a third embodiment there is provided a static version of the apparatus, as shown in FIG. 11, which could be set up for manual or automatic operation with the apparatus anchored or secured in a seaway. In relatively shallow or inshore waters the vessel control and ballast system may be dispensed with and the collection tank mounted on a jack up system from the sea bed, as shown in FIG. 12. Adjustment of the height of the leading edge of the inlet surface can be set for optimum surface oil collection by raising or lowering the jacks to suit the varying contaminated water level.

The separator tank and inlet surface height from the sea/lake bed can be adjusted by raising/lowering the legs. To optimise oil collection, the apparatus can be moved to suit the direction of current, tidal flow or surface movement produced by wind action. Alternatively the apparatus may be constructed to rotate on the supporting jack up structure. This jack up type can also be adapted to incorporate the weir system described below.

The apparatus may comprise a side mounted weir adapted to allow ingress of portions of the oil-water mixture (in contrast to the perforated deck system). The apparatus comprises a floating barrier that allows a regulated volume of the mixture to pass over the floating barrier and into a baffled tank where the oil is allowed to separate from the water. The water may be pumped out constantly if necessary leaving an increasing volume of settled-out oil to be pumped out as required into other vessels.

The floating barriers may be constructed to encourage the passage of oil-water mix by means of hot or cold water jets, a wiper, flexible rotating paddles or rotation of a barrier which may be of an absorbent nature against a fixed object which would effectively squeeze the oil out and discharge it into the tank below or onto the perforated plate.

Figure 13:
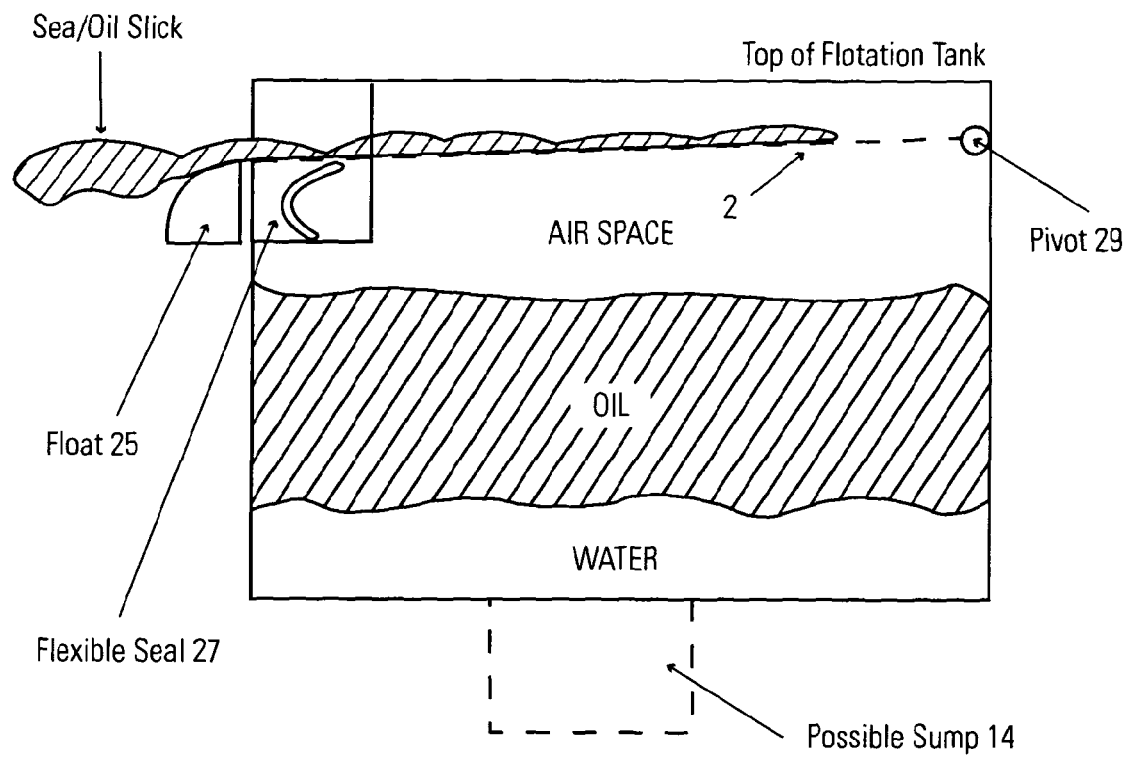
FIG. 13 is a cross-sectional view of a fourth embodiment of the apparatus.

In a fourth embodiment of the apparatus of the invention, shown in FIG. 13, the apparatus can comprise a separator tank with a perforated plate which is pivotally connected to the separator tank. The perforated plate comprises a float at its leading edge which is shaped to encourage the mixture to flow over the float across the plate and into the separator tank. The plate and attached float may also be actively raised and lowered or oscillated to further encourage flow of the mixture into the separator tank. To prevent the oil-water mixture from flowing directly into separator tank, rather than across and through the perforated plate, a sealing means is provided to seal between the tank and moving float. Alternatively, the perforated plate can be fixed and a receiving surface can be pivotally attached to the fixed plate, in the same way as illustrated in FIGS. 5-7.

It is possible to convert existing vessels into a collector vessel in accordance with the present invention. For example, sand dredgers (suction type) would have heavy duty pumps as standard equipment. They would also have flotation tanks fore and aft, with the sand/water tank amidships. Ballast adjustment by pumping water in or out of the flotation tanks would enable the vessel to float at the desired height to allow the wave action to take place and the oil to be extracted. Fine trim might also be achieved by the inflation/deflation of air bags incorporated in the buoyancy tanks. FIGS. 8 and 9 show a dredger converted to an apparatus in accordance with the present invention. As shown in FIG. 9, FIG. 1 can illustrate a cross-section along A-A' of the dredger and FIG. 2 illustrates a cross section along B-B'. As shown by FIG. 9, the water can be passed into each side of the dredger, with the perforated plate 2 curved on the inlet side (as shown in FIG. 2).

This type of apparatus may therefore have to be deployed beam on to the sea which may not be ideal, but, in present circumstances would be satisfactory in certain weather conditions.

The dredger could be anchored beam on to the oil slick, with booms employed to funnel the contaminated mixture to the dredge. Alternatively the vessel could be slowly towed. through the slick by two vessels operating at a wide angle each deploying both a boom and tow line, maintaining the dredger in an appropriate beam on position, as shown in FIG. 13.

Figure 14:
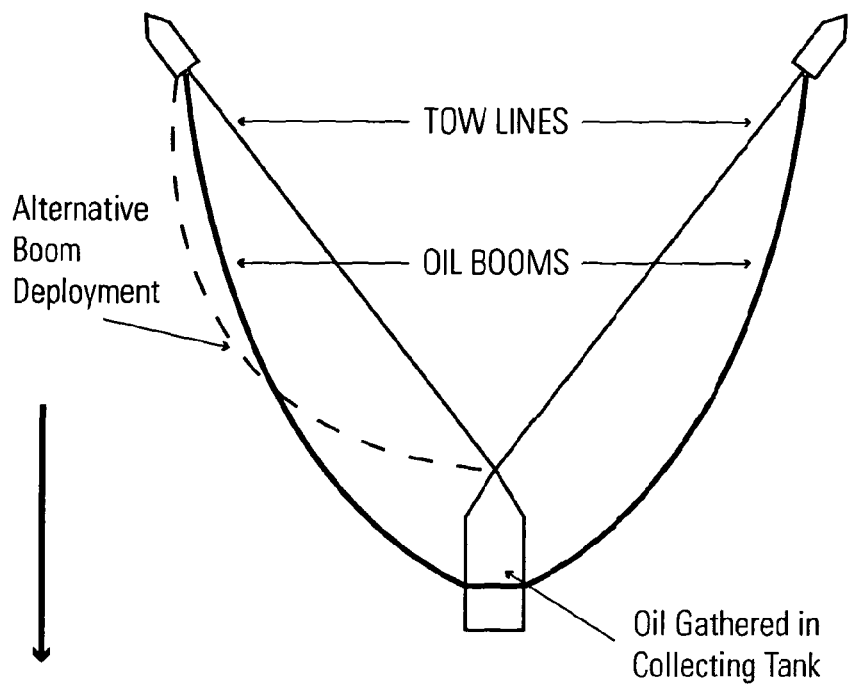
FIG. 14 is an illustration of a method in accordance with the present invention.
Figure 15:
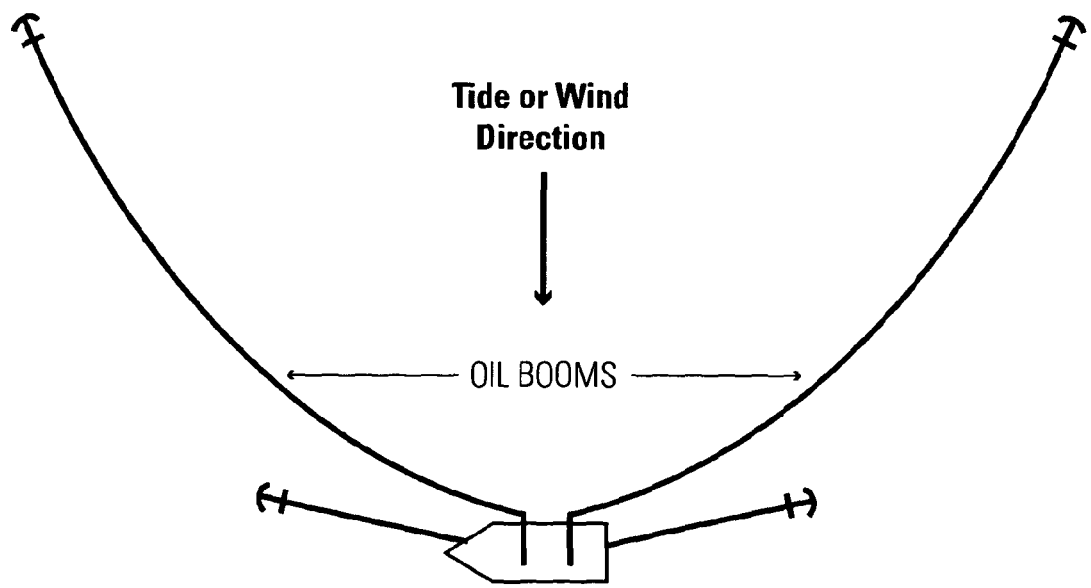
FIG. 15 is an illustration of a method in accordance with the present invention.

As a further method of collecting the oil, the dredger can be anchored with just a single boom attached to the aft end of the collection tank with the other end anchored or held in the appropriate position allowing the oil mixture to be funneled in under tidal flow, as illustrated in FIG. 14.

Each oil boom comprises an adjustable flotation means adapted to maintain the depth of submersion of the oil boom relative to the surface of the mixture. The adjustable flotation means may be a compressed airbag contained in a partially flooded float.

The dredger might, under different circumstances be slowly moving forward under its own power, but with an oil boom deplored to port, starboard, or both sides, with one or two booms deployed and towed forward by other, distant vessels, thus sweeping a large area of sea effectively.

For collection of specific or isolated areas of spill, for example close in shore or anywhere requiring special protection, the collection vessel can be simply anchored or held in position. Oil booms attached fore and aft of the tanks, on one side of the vessel or both if so designed, and the booms towed out to encircle the oil slick and winched in, forcing the oil towards the tank where it will be collected as previously described. This method can also be employed for collection of the surface oil at source, preventing or reducing its spread to a wider area.

The present invention also relates to fifth embodiment of the apparatus. The apparatus 600 comprises a floating barrier which may be used by itself or in conjunction with the apparatuses as described above.

It could be of use in situations where the contaminant oil such as the oil "plooms" detected in the Gulf of Mexico oil spill in 2010, or any other undesirable liquid is held in suspension within the sea The apparatus 600 consists of a separator tank 604 which is partially submerged in the surrounding water with its upper surface having an inlet point 602 to receive a water-oil mixture which it is intended to separate. The lower part of the vessel which is at some distance below the sea surface level, and may be set just above the sea bed, has a clean water discharge point 605 which may contain a restrictor valve to create a slight pressure within the vessel. This valve may also be one way, preventing the flow of sea water into the separator tank from below. As shown, a pump 608 may be provided to take the water from the valve to the sea surface.

The oil/water mix will be discharged into the separator tank 604 via inlet means 602 at the top. Preferably, the inlet means 602 comprises a large surface area such that there is reduced disturbance within the separator tank. Baffles may also be used within the tank to further prevent disturbance. However, for mixtures other that an oil-water mixture, the fluid separations could conceivably benefit from disturbance to aid the process.

As with the previously described apparatuses, the oil will separate from the water in the separator tank 604, and a thickening layer of oil will accumulate at the top of the vessel as the water is discharged from the vessel. This oil would eventually, having displaced the water, be emitted from the discharge valve 605 at the bottom. It is the intention to stop the discharge prior to this happening, and oil detectors may be placed at a suitable safe height above the bottom of the vessel, which would signal to stop the pumping operation either automatically or manually. As illustrated, a pump 608 may pump water up from the discharge valve to the sea surface. Such a pump may be advantageous as it allows for monitoring of the purity of the discharged water.

When the vessel has separated and collected the predetermined volume of oil, the collected oil is discharged into suitable oil tanks/bladders for salvage of the oil. When that operation is complete the apparatus can be re-deployed for further oil separation and collection As illustrated in FIG. 17, the separation vessel may for convenience of deployment take the form of a suitable flexible tube 604 which can be rolled up when not in use. It can be weighted at the bottom to ensure that it hangs vertically in the surrounding water. Flat flexible reinforced plastic, rubber or canvas tubing might be a suitable material for the purpose, it will form its natural cylindrical shape as a result of the slightly positive pressure created by the restrictor valve 605.

Alternatively, the device may take the form of a cylindrical tank 604 formed of steel, aluminium, glass fibre or any other suitable material, as illustrated in FIG. 16.

In another form, the entire vessel or container could consist of a weighted "sock" constructed of a filter membrane material which would allow the cleaned water to pass through its walls, retaining the oil within the vessel which would not require the lower water discharge valve.

This arrangement might be applicable to effectively "trawl" the sea to capture oil plooms in the depths of the sea and undertake further filtration at a convenient surface level once recovered.

The apparatus can also be used as a further filtration stage. In this embodiment, water discharged from one of the apparatuses described previously, can be passed into the apparatus as illustrated in FIG. 16 or 17. Thus, the apparatus provides an extra filtration, increasing the purity level of the water discharged into the sea.

Figure 18:
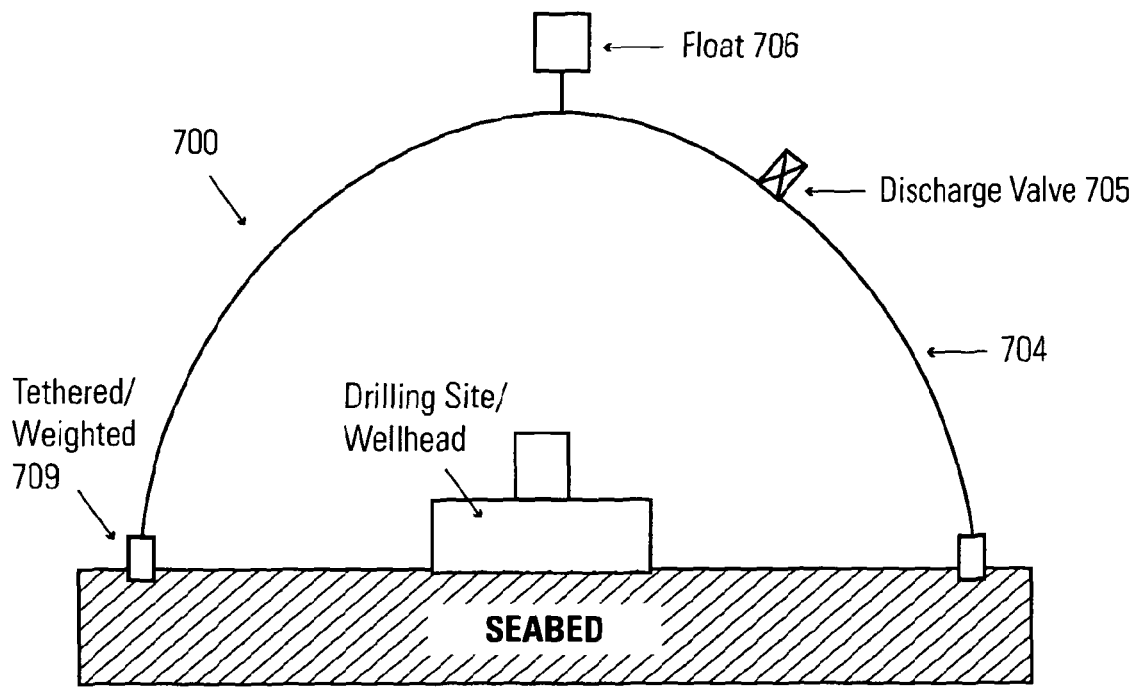
FIG. 18 is a schematic view of an apparatus in accordance with the present invention.
Figure 19:
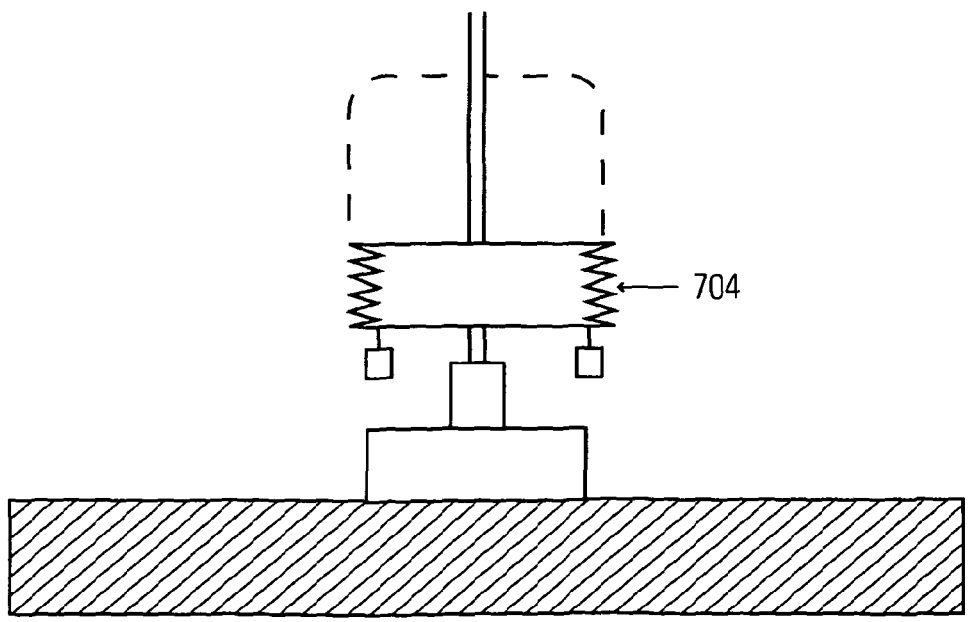
FIG. 19 is a schematic view of an apparatus in accordance with the present invention.

An apparatus 700 to capture oil leaking from a drilling site is shown in FIG. 18. In this embodiment, the separator tank 704 comprises a membrane permeable to water but not to oil, which can be place with an inlet covering the drilling site. Oil released from the drilling site can be collected within the separator tank which comprises a discharge valve 705 for removal of the collected oil. To maintain the separator tank in position, the separator tank may have an attached float 706 at its top end and may be weighted or tethered at its inlet. As with the other embodiments, a pump may be attached to the discharge valve to pump collected oil to the surface. In one embodiment, as shown in FIG. 19, the separator tank 704 may have a concertinaed form, expanding as oil is collected within the tank (the expanded state is shown by the broken lines). The separator tank may be situated over an oil stick at the drilling site and adapted to expand through oil collection in the event of an oil spillage. The apparatus of the embodiments of FIGS. 18 and 19 can be used as a safety device at drilling sites.

It will be appreciated that this description is by way of example only; alterations and modifications may be made to the described embodiment without departing from the scope of the invention as defined in the claims. For example, although the present collector vessel has been described in relation to the separation and collection of oil from a water-oil mixture, the invention is applicable to the separation of other substances from a substance-liquid mixture, for example, a finely divided solid from a liquid-solid mixture. Furthermore, the invention is equally applicable to use in a river, estuary, lake etc.

The invention claimed is:

1. An apparatus for separating a first substance from a mixture of the first substance and a liquid, the apparatus comprising:
    inlet means adapted to receive a portion of the mixture into a separator tank;
    a separator tank for holding a collected portion of the mixture and allowing the first substance to separate from the liquid due to the first substance having a different specific gravity to the liquid; and
    outlet means adapted to discharge the separated liquid and/or the first substance from the separator tank;
    wherein the inlet means comprises a perforated plate; and
    wherein there is an air space between the perforated plate and the collected portion of the mixture.

2. The apparatus according to claim 1, wherein the inlet means further comprises an inlet surface which is pivotably attached to the separator tank.

3. The apparatus according to claim 1, wherein the inlet means is an inlet surface comprising a means for reducing the disturbance of the first substance and the liquid when the mixture passes over the inlet surface and into the separator tank.

4. The apparatus according to claim 1, comprising a first outlet means for discharging the liquid and a second outlet means for discharging the first substance.

5. The apparatus according to claim 1, wherein the separator tank comprises a baffle for reducing the disturbance of the liquid and the first substance in the separator tank.

6. The apparatus according to claim 1, further comprising a means for detecting a purity level of the liquid.

7. The apparatus according to claim 6, wherein the means for detecting comprises a sampler pump to extract a portion of the liquid from the tank and a detector configured to detect the purity level of the portion of the liquid.

8. The apparatus according to claim 6, further comprising a discharge pump for extracting the separated liquid from the separator tank via the outlet means and a switching means configured to switch off the discharge pump when the purity level of the liquid falls below a predetermined threshold value.

9. The apparatus according to claim 1, wherein the apparatus is a vessel adapted to float within the mixture and the vessel comprises a flotation means to maintain the depth of submersion relative to the surface of the mixture, and the inlet means is adapted for receiving a portion of the mixture from the surface of the mixture.

10. The apparatus according to claim 1, the apparatus further comprising a receiving surface pivotally connected to the inlet means, the receiving surface adapted to allow the portion of the mixture to flow over the receiving surface to the inlet means.

11. The apparatus of claim 10, wherein the receiving surface comprises a flotation means to maintain an inlet side of the receiving surface a fixed distance relative from the surface of the mixture.

12. The apparatus according to claim 1, wherein the separator tank comprises a flexible membrane.

13. A system for separating a first substance from a mixture of the first substance and a liquid, the system comprising:
a first apparatus comprising:
inlet means adapted to receive a portion of the mixture into a separator tank;
a separator tank for holding a collected portion of the mixture and allowing the first substance to separate from the liquid due to the first substance having a different specific gravity to the liquid; and
outlet means adapted to discharge the separated liquid and/or the first substance from the separator tank;
wherein the inlet means comprises a perforated plate; and
wherein there is an air space between the perforated plate and the collected portion of the mixture; and
a second apparatus comprising:
inlet means adapted to receive a portion of the mixture into a separator tank;
a separator tank for holding a collected portion of the mixture and allowing the first substance to separate from the liquid due to the first substance having a different specific gravity to the liquid; and
outlet means adapted to discharge the separated liquid and/or the first substance from the separator tank;
wherein the system is configured such that the separated liquid discharged from the outlet of the first apparatus is passed into the inlet means of the second apparatus.

14. A system for separating a first substance from a mixture of the first substance and a liquid, the system comprising:
an apparatus comprising:
inlet means adapted to receive a portion of the mixture into a separator tank;
a separator tank for holding a collected portion of the mixture and allowing the first substance to separate from the liquid due to the first substance having a different specific gravity to the liquid; and
outlet means adapted to discharge the separated liquid and/or the first substance from the separator tank;
wherein the apparatus is a vessel adapted to float within the mixture and the vessel comprises a flotation means to maintain the depth of submersion relative to the surface of the mixture, and the inlet means is adapted for receiving a portion of the mixture from the surface of the mixture; and
at least one boom connected to the apparatus and adapted to direct the mixture to the apparatus, wherein each boom comprises an adjustable flotation means adapted to maintain the depth of submersion of the boom relative to the surface of the mixture,
wherein the inlet means comprises a perforated plate; and
wherein there is an air space between the perforated plate and the collected portion of the mixture.

15. A method for separating a first substance from a mixture of the first substance and a liquid using an apparatus comprising:
inlet means adapted to receive a portion of the mixture into a separator tank;
a separator tank for holding a collected portion of the mixture and allowing the first substance to separate from the liquid due to the first substance having a different specific gravity to the liquid; and
outlet means adapted to discharge the separated liquid and/or the first substance from the separator tank;
wherein the apparatus is a vessel adapted to float within the mixture and the vessel comprises a flotation means to maintain the depth of submersion relative to the surface of the mixture, and the inlet means is adapted for receiving a portion of the mixture from the surface of the mixture;
wherein the inlet means comprises a perforated plate; and
wherein there is an air space between the perforated plate and the collected portion of the mixture;
wherein the method comprises:
passing a portion of the mixture through the inlet means of the apparatus such that the mixture is received by the separating tank of the apparatus;
separating in the separator tank the first substance from the liquid due to the first substance having a different specific gravity to the liquid; and
discharging the separated liquid and/or the first substance from the separator tank via an outlet means.

16. The method of claim 15, further comprising detecting a purity level of the separated liquid.

17. The method of claim 15, further comprising extracting a portion of the liquid from the tank and detecting the purity level of the portion of the liquid.

18. The method of claim 17, further comprising connecting the apparatus to a pair of booms and towing the apparatus through the mixture, wherein the booms are adapted to direct the mixture to the apparatus.

* * * * *